W. H. KELLER.
PERCUSSION TOOL.
APPLICATION FILED APR. 13, 1918.
1,350,505.  Patented Aug. 24, 1920.
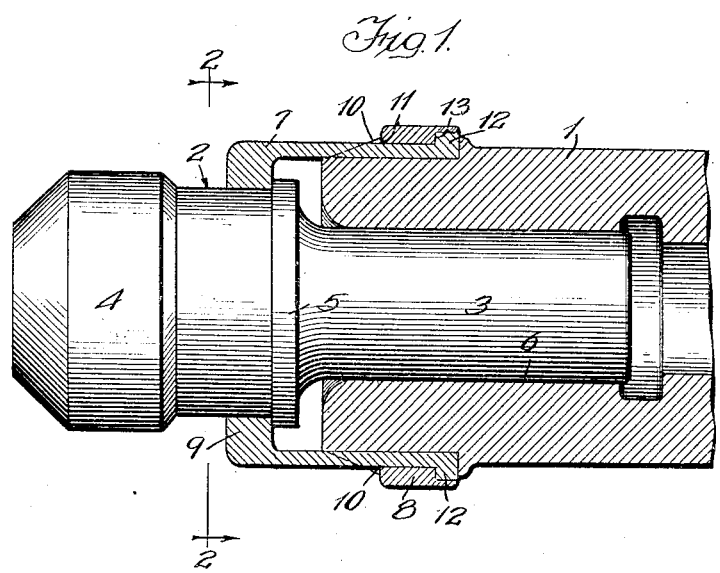
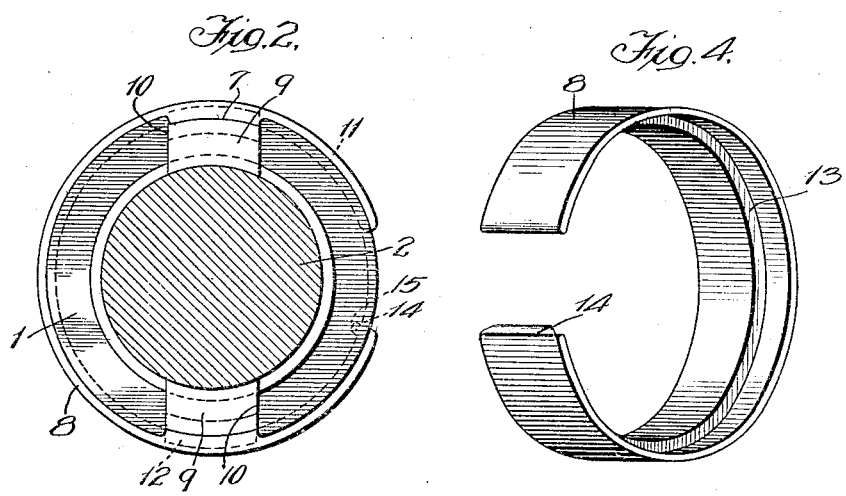
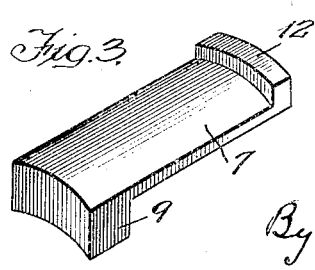
Witnesses:
W. F. Kilroy
Harry R. White
Inventor:
William H. Keller
By Miller, Chindahl & Parker
Attys.

UNITED STATES PATENT OFFICE.

WILLIAM H. KELLER, OF GRAND HAVEN, MICHIGAN, ASSIGNOR TO KELLER PNEUMATIC TOOL COMPANY, OF GRAND HAVEN, MICHIGAN, A CORPORATION OF MICHIGAN.

PERCUSSION-TOOL.

1,350,505.

Specification of Letters Patent. Patented Aug. 24, 1920.

Application filed April 13, 1918. Serial No. 228,341.

*To all whom it may concern:*

Be it known that I, WILLIAM H. KELLER, a citizen of the United States, residing at Grand Haven, in the county of Ottawa and State of Michigan, have invented certain new and useful Improvements in Percussion-Tools, of which the following is a specification.

This invention relates to percussion tools and more particularly to rivet set retainers therefor; and the object of the invention is to provide a rivet set retainer of improved construction and arrangement which is made up of separate parts arranged to be interlocked with each other and with the body of the tool.

The object of the invention thus generally stated, together with other and ancillary advantages, is attained by the construction and arrangement illustrated in the accompanying drawings forming part hereof in which Figure 1 is a longitudinal sectional view through the forward end of a pneumatic hammer embodying the features of my invention. Fig. 2 is a transverse sectional view taken on line 2—2 of Fig. 1. Fig. 3 is a perspective view of one of the members which is arranged when clamped upon the tool body to engage with the rivet set to hold it in the body. Fig. 4 is a perspective view of the clamping ring for locking said holding members in position upon the tool body.

In the drawings, 1 indicates the body of a pneumatic hammer having a rivet set 2 in its forward end. The hammer body may be of any preferred construction, and the rivet set comprises a shank 3, a head 4, and an intermediate flange or annular shoulder 5, the hammer body being provided with a bore 6 for the shank 3 and the inward movement of the set in the body being limited by the shoulder 5 abutting against the forward end of the body 1.

The retainer is adapted to limit the outward movement of the rivet set in the body and comprises a pair of members 7, arranged to be clamped upon the tool body by means of a split ring 8, and each having a dog 9 projecting radially inwardly into the path of movement of the shoulder 5 of the rivet set so as to limit its outward movement in the body.

The members 7 are in the form of short bars and are arranged to fit neatly in oppositely disposed grooves 10 in the periphery of the tool body, the dogs 9 being formed on the forward ends of the members. Said grooves 10 are made of a depth slightly greater than the thickness of the members 7, and a circumferentially extending groove 11 is also provided in the body so as to intersect the grooves 10, the split ring 8 being arranged to enter said groove 11 to clamp the members in position upon the body. For this purpose the rear ends of the members 7 are provided with outwardly extending lugs 12, the forward edges of which are arranged to lie substantially flush with the rear edge of the groove 11, and the inner rear edge of the ring 8 is provided with a complementary angular groove 13, which is arranged to engage with the forward edges of the lugs 12 and also to overlie the outer edges thereof. The groove 11 extends around the body 1 to an extent corresponding to the length of the split ring 8, and one end of said ring is bent inwardly to form a dog 14 which is adapted to yieldingly engage with a notch 15 in the body of the tool.

By the construction set forth it will be evident that the rivet set may be firmly held in operative position in the tool body. The members 7, carrying the dogs 9 which engage with the annular shoulder on the rivet set, are securely held in position in their longitudinally extending grooves 10 by the ring 8, which engages at its forward edge with the forward edge of the circumferential groove 11 and at its rear edge with the outwardly extending lugs 12. When it is desired to remove the rivet set from the tool body, it is only necessary to spring the dog 14 on the ring 8 out of engagement with its notch 15, whereupon the ring may be readily removed and the members 7 disengaged from their grooves to permit the removal of the rivet set.

I claim as my invention:—

1. A percussion tool comprising, in combination, a body having formed in its periphery a longitudinal groove and an intersecting annular groove, the longitudinal groove being made of a depth greater than that of the annular groove, a tool operable in the body and having an annular flange, a holding member for the tool arranged to fit snugly in said longitudinal groove and having at its forward end a portion protruding into the path of movement of said tool flange, a retaining ring for said member fitting snugly in said annular groove and overlying the rear end of the holding member in the longitudinal groove, and means whereby the holding member and its retaining ring are adapted to interengage so that the retaining ring holds the holding member against movement in the operation of the tool.

2. A percussion tool having, in combination, a body having a longitudinal groove in its forward end, a rivet set operable in the body and having a shoulder arranged to engage with the body to limit the inward movement of the set, and a retainer for limiting the outward movement of the rivet set comprising a member fitting into said longitudinal groove in the body and having an inwardly extending dog on its forward end engaging with the shoulder on the rivet set and an outwardly extending lug on its rear end, and means engaging with the lug and clamping said member in said groove.

3. A percussion tool having, in combination, a body having a longitudinal groove in its forward end and a circumferential groove intersecting said longitudinal groove, a rivet set in the body having a shoulder arranged to engage with the body to limit the inward movement of the set, a member fitting neatly in said longitudinal groove in the body but being of less thickness than the depth of the groove and a ring arranged to lie in said circumferential groove and to engage with the member to hold it in its groove, said member having a lug on its rear end for engagement by the inner rear edge of said ring and having a dog on its forward end for engagement by said shoulder on the rivet set to limit the outward movement of the set.

In testimony whereof, I have hereunto set my hand.

WILLIAM H. KELLER.